US012673554B2

(12) United States Patent
Miller et al.

(10) Patent No.: US 12,673,554 B2
(45) Date of Patent: Jul. 7, 2026

(54) SITUATIONALLY UPDATING A VEHICLE DISPLAY

(71) Applicant: Rivian IP Holdings, LLC, Irvine, CA (US)

(72) Inventors: Matthew Royce Miller, San Francisco, CA (US); Kok Wei Koh, Mountain View, CA (US); Jingying Lin, San Mateo, CA (US); Krishna Kumar Madaparambil, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 256 days.

(21) Appl. No.: 18/478,915

(22) Filed: Sep. 29, 2023

(65) Prior Publication Data

US 2025/0108690 A1 Apr. 3, 2025

(51) Int. Cl.
| | |
|---|---|
| *B60K 35/29* | (2024.01) |
| *B60K 35/10* | (2024.01) |
| *B60K 35/22* | (2024.01) |
| *B60K 35/28* | (2024.01) |

(52) U.S. Cl.
CPC ............... *B60K 35/29* (2024.01); *B60K 35/10* (2024.01); *B60K 35/22* (2024.01); *B60K 35/28* (2024.01); *B60K 2360/167* (2024.01); *B60K 2360/182* (2024.01); *B60K 2360/1868* (2024.01)

(58) Field of Classification Search
CPC ........ B60K 35/29; B60K 35/22; B60K 35/28; B60K 2360/182; B60K 35/00
See application file for complete search history.

(56) References Cited

U.S. PATENT DOCUMENTS

| | | | | |
|---|---|---|---|---|
| 2018/0154831 A1* | 6/2018 | Spencer | ............... | H04N 5/2628 |
| 2020/0326850 A1* | 10/2020 | Ezaki | ........................ | G09G 5/34 |
| 2022/0111730 A1* | 4/2022 | Kakimaru | ................. | G06F 3/02 |

* cited by examiner

*Primary Examiner* — Abby J Flynn
*Assistant Examiner* — Clint Pham
(74) *Attorney, Agent, or Firm* — Patterson + Sheridan, LLP

(57) ABSTRACT

In certain embodiments, a method of situationally updating a vehicle display includes causing, by a vehicle control system, a first view to be displayed on the vehicle display, where the first view includes a first display region. The method also includes receiving, by the vehicle control system, an information trigger in relation to a vehicle including the vehicle display. The method also includes, responsive to the information trigger, causing, by the vehicle control system, a second view to be displayed on the vehicle display. The second view includes the first display region together with a situational display region. The second view adjusts the first display region relative to the first view to accommodate the situational display region.

20 Claims, 11 Drawing Sheets

506C       508       510       512

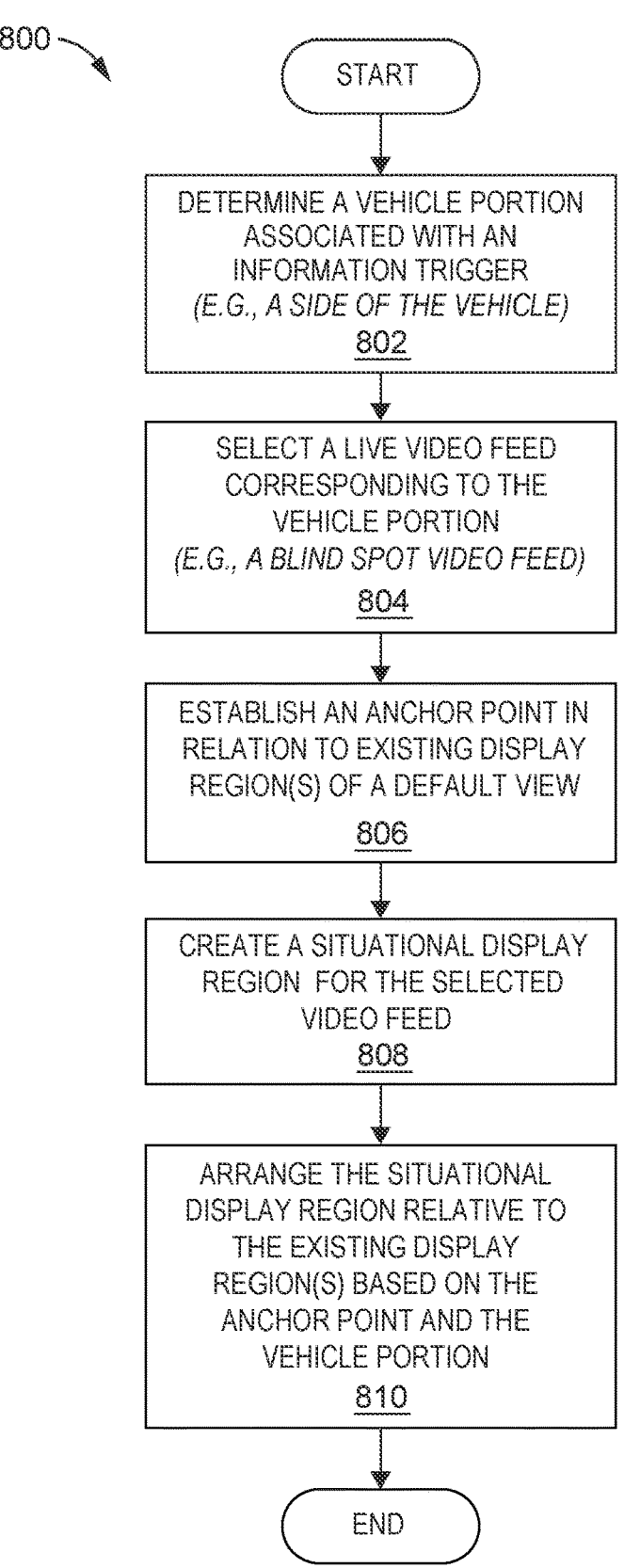

800

START

DETERMINE A VEHICLE PORTION
ASSOCIATED WITH AN
INFORMATION TRIGGER
(E.G., A SIDE OF THE VEHICLE)
802

SELECT A LIVE VIDEO FEED
CORRESPONDING TO THE
VEHICLE PORTION
(E.G., A BLIND SPOT VIDEO FEED)
804

ESTABLISH AN ANCHOR POINT IN
RELATION TO EXISTING DISPLAY
REGION(S) OF A DEFAULT VIEW
806

CREATE A SITUATIONAL DISPLAY
REGION FOR THE SELECTED
VIDEO FEED
808

ARRANGE THE SITUATIONAL
DISPLAY REGION RELATIVE TO
THE EXISTING DISPLAY
REGION(S) BASED ON THE
ANCHOR POINT AND THE
VEHICLE PORTION
810

END

FIG. 8

SITUATIONALLY UPDATING A VEHICLE DISPLAY

INTRODUCTION

The present disclosure relates to vehicle dynamics, and more particularly, but not by way of limitation, to situationally updating a vehicle display.

SUMMARY

In certain embodiments, one general aspect includes a method of situationally updating a vehicle display. The method includes causing, by a vehicle control system, a first view to be displayed on the vehicle display, where the first view includes a first display region. The method also includes receiving, by the vehicle control system, an information trigger in relation to a vehicle including the vehicle display. The method also includes, responsive to the information trigger, causing, by the vehicle control system, a second view to be displayed on the vehicle display. The second view includes the first display region together with a situational display region. The second view adjusts the first display region relative to the first view to accommodate the situational display region.

In certain embodiments, another general aspect includes a system for situationally updating a vehicle display. The system includes a vehicle display and a vehicle control system communicably coupled to the vehicle display. The vehicle control system is operable to cause a first view to be displayed on the vehicle display, where the first view includes a first display region. The vehicle control system is further operable to receive an information trigger in relation to a vehicle including the vehicle display. The vehicle control system is further operable, responsive to the information trigger, to cause a second view to be displayed on the vehicle display. The second view includes the first display region together with a situational display region. The second view adjusts the first display region relative to the first view to accommodate the situational display region.

BRIEF DESCRIPTION OF THE DRAWINGS

FIG. 8 illustrates an example of a process for generating a situational view, in accordance with certain embodiments of the present disclosure.

DETAILED DESCRIPTION

In certain vehicles, cameras and/or sensors are used, for example, to improve a driver's awareness of situations in or around the vehicle, such as objects or vehicles in blind spots. In general, a blind spot may refer to an area outside the driver's field of vision. In some cases, blind spots are not viewable through rear-view mirrors or windows. For example, there may be a blind spot on each of a driver side and a passenger side of the vehicle.

A challenge in vehicle safety is improving a driver's situational awareness, for example, of blind spots, without compromising safety in other respects. Effective visual presentation can be particularly challenging. Visual information that is presented in an unexpected way, or that is not easily viewable, may be ignored, misinterpreted, or cause distraction. Further, as a practical matter, modes of visually presenting information to the driver are limited. Thus, visual presentation of new information may, at times, obscure or replace other information expected by the driver.

The present disclosure describes examples of methods and systems for situationally updating a vehicle display. In certain embodiments, a vehicle display proximate a driver, such as an instrument cluster, can display a default view that includes separate display regions for different types of dynamic vehicle information such as map data, Advanced Driver-Assistance Systems (ADAS) data, and/or vehicle speed. In response to an information trigger, such as an active turn signal or detection of an object, the vehicle display can display an updated view that includes an additional display region for situational data related to the information trigger, such as a blind spot video feed for a relevant side of the vehicle. The updated view may adjust one or more display regions of the default view to accommodate (e.g., create space for) the additional display region on the vehicle display. Examples will be described relative to the Drawings.

Figure 1:
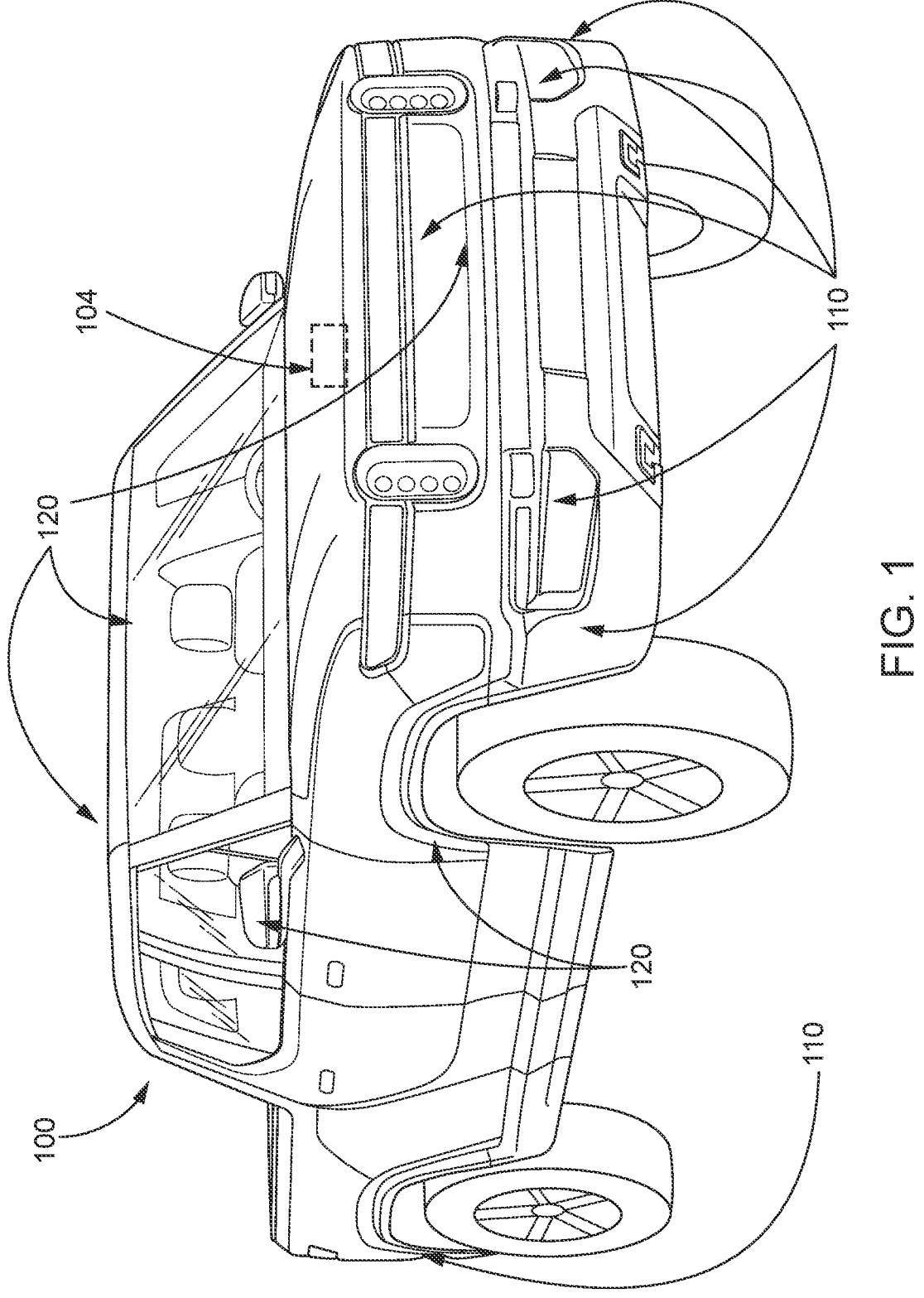
FIG. 1 illustrates an example of a vehicle, in accordance with certain embodiments of the present disclosure.

FIG. 1 illustrates an example vehicle 100, in accordance with certain embodiments of the present disclosure. Vehicle 100 may include multiple sensors 110, multiple cameras 120, and a control system 104. As an example and not by way of limitation, the sensors 110 may be, or include, an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, a motion sensor, another suitable sensor, or a combination thereof. As an example and not by way of limitation, a camera 120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 may include various controllable components (e.g., doors, seats, windows, lights, HVAC, entertainment system, security system) and instrument and information displays and/or interactive interfaces.

While FIG. 1 depicts one or more of cameras 120 in particular locations, it should be appreciated that any suitable number of cameras may be employed (e.g., any number of cameras positioned at a front, rear and each side of vehicle 100). Such cameras 120 may be mounted at any suitable respective positions or portions of vehicle 100 in order to facilitate the capturing of images of the entire region or environment around vehicle 100, while vehicle 100 is stationary or in motion. A series of images may be captured by cameras 120, including any suitable number of images. In some embodiments, images may be captured repeatedly, e.g., at a predetermined frequency, to capture the surrounding environment of vehicle 100. In similar fashion, sensors 110 may be deployed in any suitable number and/or in any suitable location relative to vehicle 100.

More particularly, in certain embodiments, cameras 120 are configured to capture images of blind spots relative to vehicle 100, as all or part of their field of view. For example, in certain embodiments, at least one of the cameras 120 is configured to capture images of a blind spot on a driver side of vehicle 100, and at least one of the cameras 120 is configured to capture images of a blind spot on a passenger side of vehicle 100. In addition, or alternatively, sensors 110 are configured to produce outputs indicative of a presence of a vehicle or object in such a blind spot, for example, on the driver side or passenger side of vehicle 100.

Control system 104 may enable control of various systems on-board the vehicle. Control system 104 may communicate with, and control operation of, cameras 120 and sensors 110. Example operation of control system 104 will be described in greater detail relative to FIG. 3.

Figure 2:
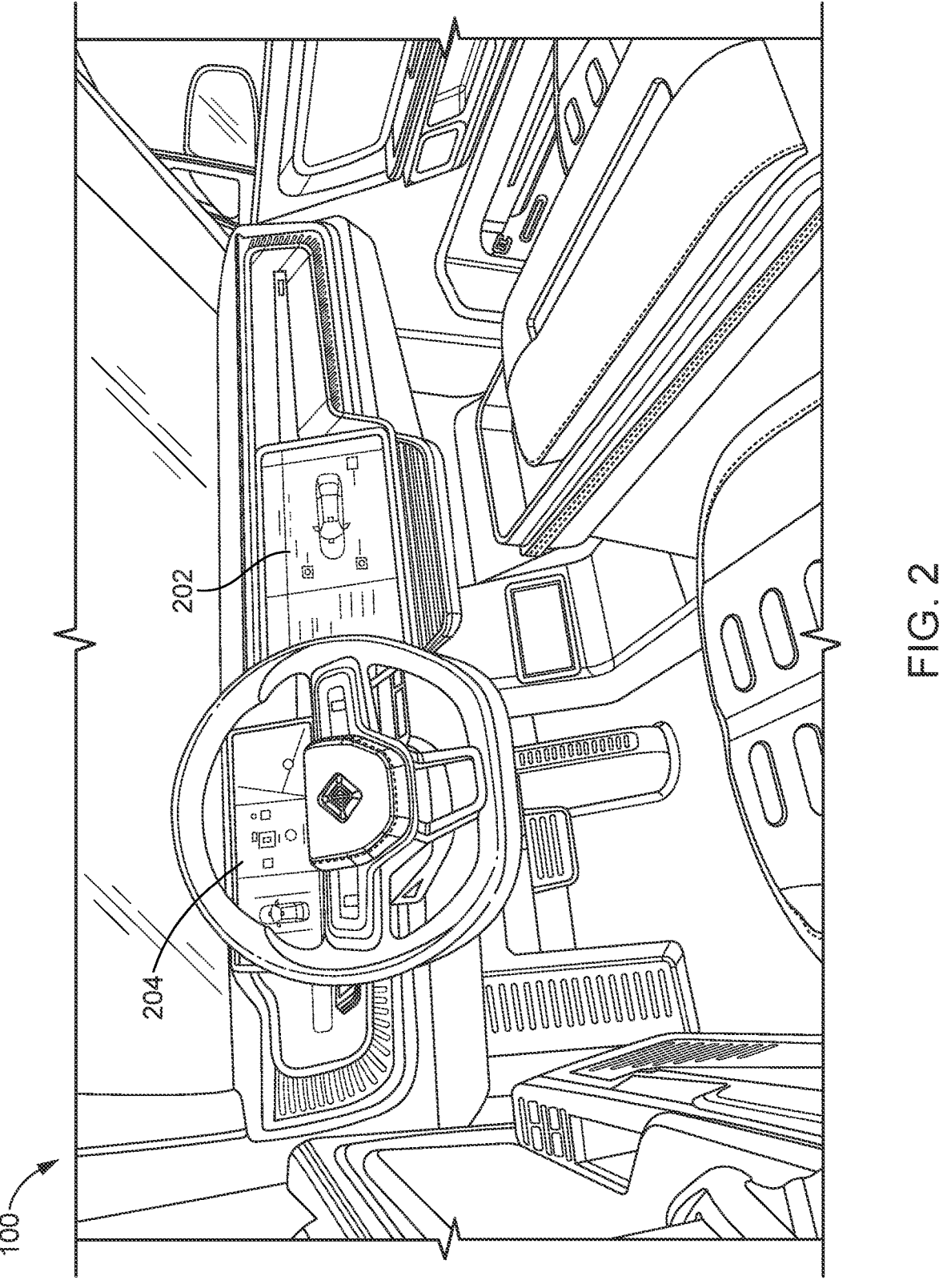
FIG. 2 illustrates examples of vehicle displays that may be included in the vehicle of FIG. 1, in accordance with certain embodiments of the present disclosure.

FIG. 2 illustrates examples of vehicle displays that may be included in vehicle 100, in accordance with certain embodiments of the present disclosure. In the example of FIG. 2, two front displays, namely, an infotainment display 202 and an instrument cluster 204, are shown. It should be appreciated, however, that the vehicle displays shown in FIG. 2 are merely illustrative. Other displays, such as one or more rear displays and/or additional front displays may also be included.

In certain embodiments, a vehicle display proximate the driver, such as the instrument cluster 204, can include separate display regions for different types of dynamic vehicle information such as GPS map data, ADAS data, and vehicle speed. In response to an information trigger, such as an active turn signal or detection of an object, the vehicle display shows an updated view that includes an additional display region for situational data related to the information trigger (e.g., a blind spot video feed for a relevant side of the vehicle). The updated view may adjust one or more display regions of the default view to accommodate (e.g., create space for) the additional display region. For simplicity of description, examples will be described herein with respect to the instrument cluster 204. It should be appreciated, however, that the principles described herein are similarly applicable to other vehicle displays that may be proximate the driver, or viewable by the driver, such as displays in or around a dash or windshield, including the infotainment display 202 in some cases.

Figure 3:
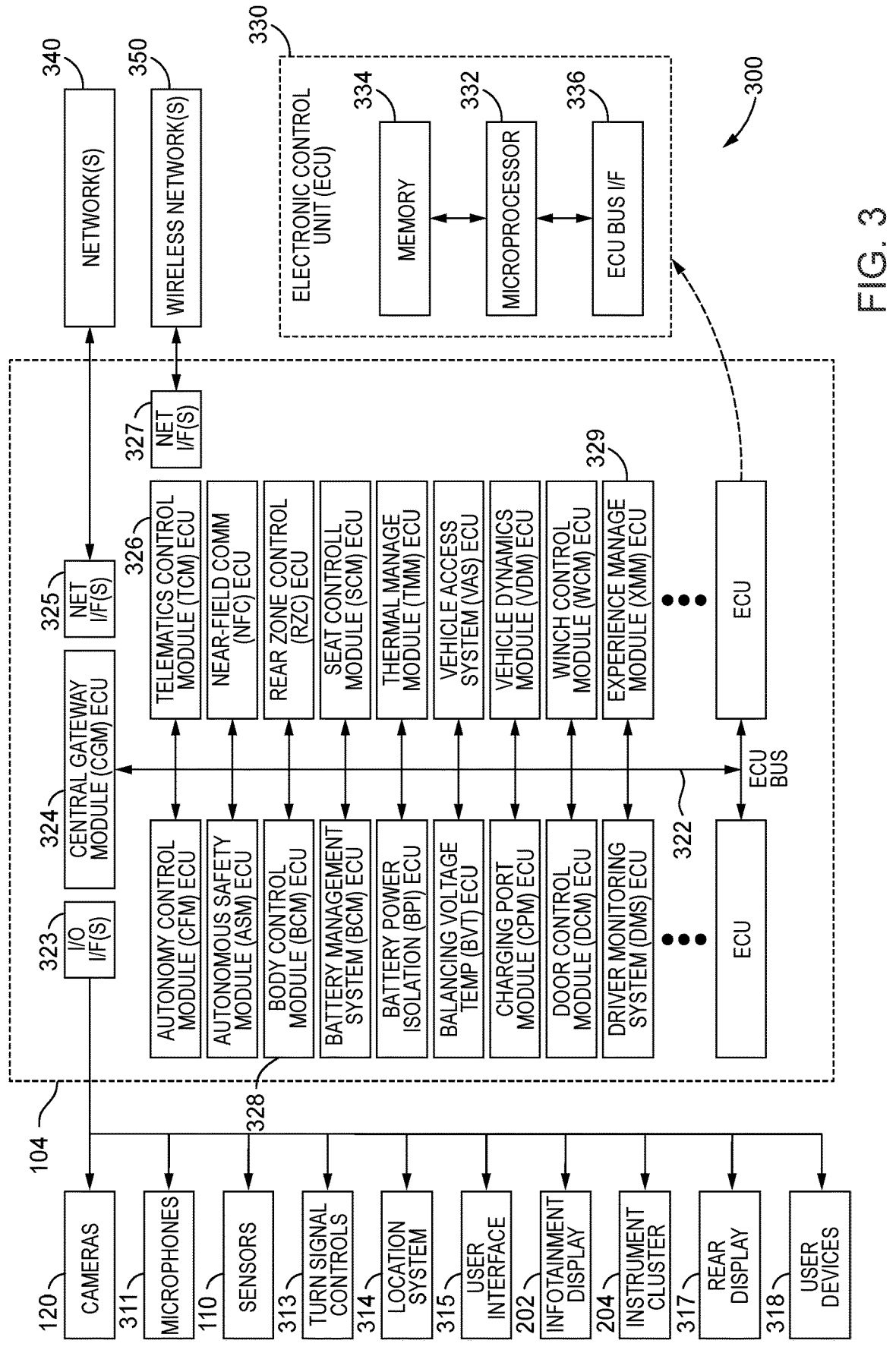
FIG. 3 illustrates a block diagram of example components of a vehicle, in accordance with certain embodiments of the present disclosure.

FIG. 3 illustrates a block diagram 300 of example components of vehicle 100, in accordance with certain embodiments of the present disclosure. As described relative to FIG. 1, vehicle 100 includes control system 104, where control system 104 is configured to perform the functions described relative to FIG. 1, as well as other functions for operation of vehicle 100. In many embodiments, control system 104 includes a number of electronic control units (ECUs) 330 coupled to ECU Bus 322. Each ECU 330 performs a particular set of functions, and includes, inter alia, microprocessor 332 coupled to memory 334 and ECU Bus I/F 336. In certain embodiments, control system 104 may include one or more system-on-chips (SOCs). Each SOC may include a number of multi-core processors coupled to a high-speed interconnect and on-chip memory, and may perform a much larger set of functions than a single ECU 330.

Control system 104 is coupled to sensors, input/output (I/O) devices and actuators, as well as other components within a propulsion system, an energy storage system, and/or an accessory system. The sensors may include, for example, cameras 120, microphones 311, sensors 110, location system 314, etc. The I/O devices may include, for example, user interface 315, infotainment display 202, instrument cluster 204, rear display 317, turn signal controls 313, user devices 318, etc. The actuators may include, for example, actuators that adjust cameras 120 and/or actuators that activate and deactivate turn signals. Additionally, control system 104 may be coupled to network(s) 340, network(s) 350, etc. In certain embodiments, one or more ECUs 330 may include the necessary interfaces to be coupled directly to particular sensors, I/O devices, actuators and other vehicle system components.

In many embodiments, control system 104 includes Central Gateway Module (CGM) ECU 324 which provides a central communications hub for vehicle 100. CGM ECU 324 includes (or is coupled to) I/O interfaces 323 to receive data, send commands, etc., to and from the sensors, I/O devices, actuators and other vehicle system components. CGM ECU 324 also includes (or is coupled to) network interface(s) 325 that provides network connectivity through Controller Area Network (CAN) ports, Local Interconnect Network (LIN) ports, Ethernet ports, etc.

For example, CGM ECU 324 may receive data from cameras 120, microphones 311, sensors 110, turn signal controls 313 and location system 314, as well as user interface 315, and then communicate the data over ECU Bus 322 to the appropriate ECU 330. Similarly, CGM ECU 324 may receive commands and data from the ECUs 330 and send them to the appropriate I/O devices, actuators and vehicle components. For example, a GUI widget may be sent to user interface 315 (e.g., infotainment display 202, instrument cluster 204, rear display 317, and/or user devices 318), and video data from cameras 120 may be sent to infotainment display 202, instrument cluster 204, rear display 317, user devices 318 etc.

In many embodiments, control system 104 includes Telematics Control Module (TCM) ECU 326 which provides a vehicle communication gateway for vehicle 100. TCM ECU 326 includes (or is coupled to) network interface(s) 327 that provides network connectivity to support functionality such as over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), automated calling functionality, etc.

In many embodiments, control system 104 also includes, inter alia, Autonomy Control Module (ACM) ECU, Autonomous Safety Module (ASM) ECU, Body Control Module (BCM) ECU, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS) ECU, Vehicle Dynamics Module (VDM) ECU, Winch Control Module (WCM) ECU, an Experience Management Module (XMM) ECU, etc.

In some embodiments, ASM ECU 328 and/or another of the ECUs 330 may provide functions to support driving safety by monitoring sensors 110 and/or cameras 120. In various embodiments, ASM ECU 328 may be configured to identify vehicles or other objects in the images captured by cameras 120 using any suitable image recognition technique. In some cases, object proximity to vehicle 100 may be estimated based on an object detection representation. In addition, or alternatively, ASM ECU 328 can identify a presence of a vehicle or other object in a blind spot based on an output from one of the sensors 110, or based on a combination of such outputs.

In certain embodiments, ASM ECU 328 may be configured to generate a safety alert indicative of a presence of a vehicle or other object relative to a portion of vehicle 100. The safety alert may indicate, for example, the portion of the vehicle 100, such as the driver side, passenger side, front, rear, etc. In certain embodiments, the portion of the vehicle may correspond to a blind spot, for example, on the driver side or passenger side of vehicle 100.

In certain embodiments, turn signal controls 313 enable turn signal activation for each of the driver side and passenger side of vehicle 100. In some cases, turn signal controls 313 can be driver-activated. In addition, or alternatively, turn signal controls 313 can be system-activated, for example, if vehicle 100 is being driven at least partially autonomously.

In some embodiments, XMM ECU 329 an/or other of the ECUs 330 may provide functions to situationally update a vehicle display proximate a driver, such as the instrument cluster 204, based on the operation of the ASM ECU 328, the turn signal controls 313, and/or other components. In an example, the XMM ECU 329 can monitor the ASM ECU 328 and/or another of the ECUs 130 for an information trigger. The information trigger can be, for example, a safety alert from the ASM ECU 328 that indicates a vehicle or other object relative to a portion of vehicle 100, as described previously. In another example, the XMM ECU 329 can monitor the turn signal controls 313 for an information trigger, which trigger may be an active turn signal notification for a driver or passenger side of vehicle 100. Example operation of the XMM ECU 329 to situationally update a vehicle display based on information triggers will be described in greater detail relative to FIGS. 4A-B.

Figure 4A:
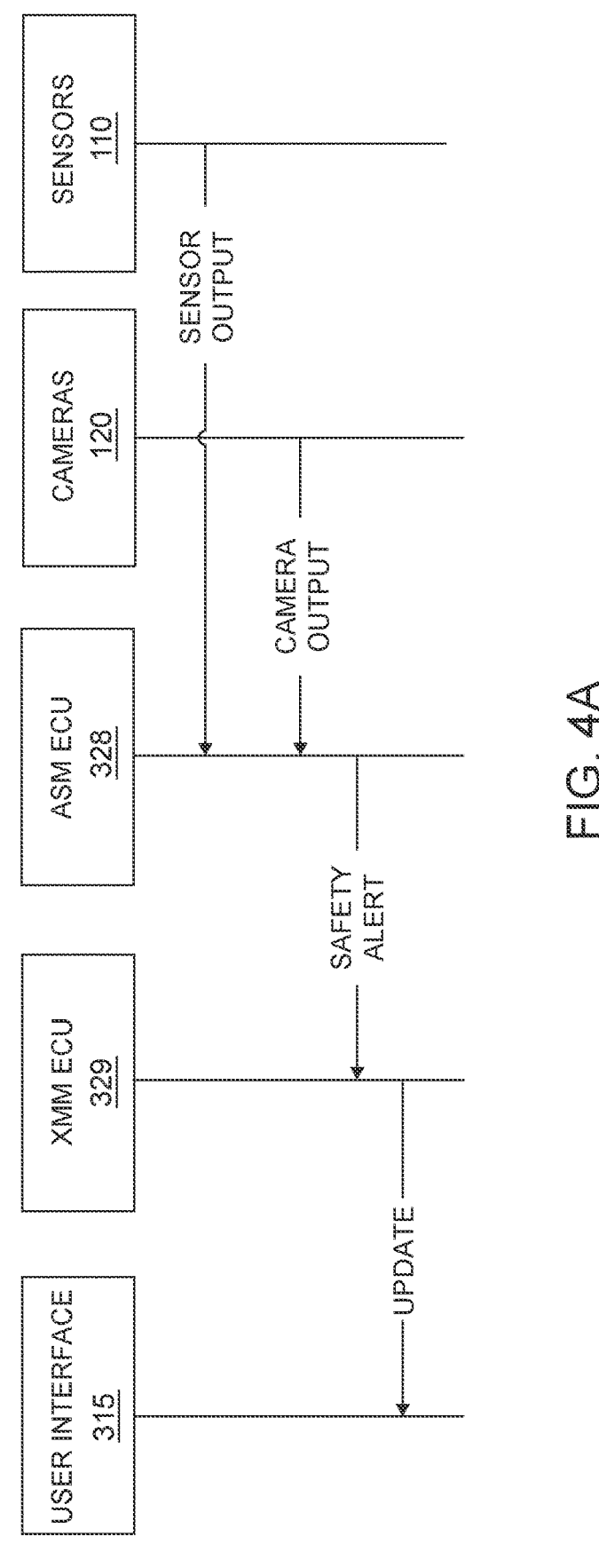
FIG. 4A illustrates an example of a sequence diagram for updating a vehicle display based on information received from the cameras or sensors, in accordance with certain embodiments of the present disclosure.

FIG. 4A illustrates an example of a sequence diagram 400A for updating a vehicle display based on information received from the cameras 120 and/or the sensors 110, in accordance with certain embodiments of the present disclosure. Generally, the sequence diagram 400A depicts the user interface 315, the XMM ECU 329, the ASM ECU 328, the cameras 120, and the sensors 110. Although not explicitly indicated as such in FIG. 4A, it should be appreciated that the user interface 315, the XMM ECU 329, the ASM ECU 328, the cameras 120, and the sensors 110 may exchange any signals, commands or other data via, for example, the I/O interfaces 323 and/or the CGM ECU 324 as described relative to FIG. 3.

The ASM ECU 328 may receive a sensor output from one or more of the sensors 110 and/or a camera output from one or more of the cameras 120. As described relative to FIG. 3, the ASM ECU 328 may determine, based on the sensor output and/or the camera output, a presence of a vehicle or other object relative to a portion of vehicle 100. In response to determining the presence of a vehicle or other object relative to a portion of vehicle 100, the ASM ECU 328 produces a safety alert indicating, for example, the presence of the vehicle or other object and the portion of the vehicle 100. The XMM ECU 329 may receive the safety alert as an information trigger and, based thereon, update the user interface 315, which may include updating the instrument cluster 204, for example, as described in more detail relative to FIGS. 5A-C and 6A-C.

Figure 4B:
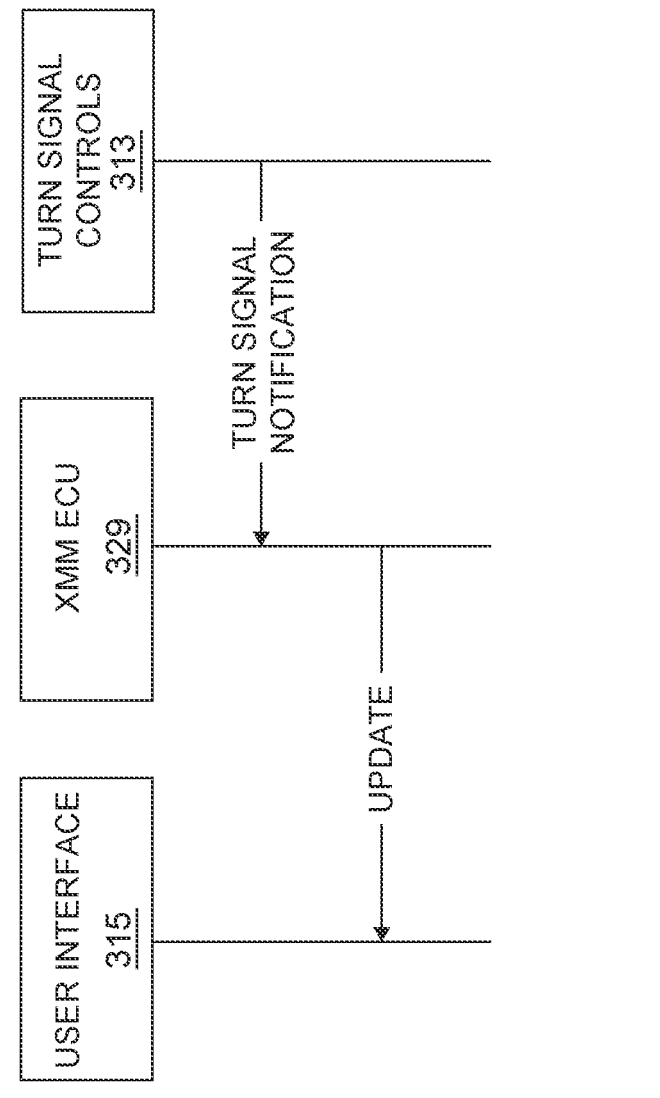
FIG. 4B illustrates an example of a sequence diagram for updating a vehicle display based on information received from turn signal controls, in accordance with certain embodiments of the present disclosure.
Figure 4B:

FIG. 4B illustrates an example of a sequence diagram 400B for updating a vehicle display based on information received from the turn signal controls 313, in accordance with certain embodiments of the present disclosure. Generally, the sequence diagram 400B depicts the user interface 315, the XMM ECU 329, and the turn signal controls 313. Although not explicitly indicated as such in FIG. 4B, it should be appreciated that the user interface 315, the XMM ECU 329, and the turn signal controls 313 may exchange any signals, commands or other data via, for example, the I/O interfaces 323 and/or the CGM ECU 324 as described relative to FIG. 3.

In response to activation of a driver side or passenger side turn signal, the turn signal controls 313 produce a turn signal notification. The turn signal notification may indicate, for example, an active turn signal and a corresponding side of vehicle 100 (e.g., the driver side or passenger side). The XMM ECU 329 may receive the turn signal notification as an information trigger and, based thereon, update the user interface 315, which may include updating the instrument cluster 204, for example, as described in more detail relative to FIGS. 5A-C and 6A-C.

Figure 5A:
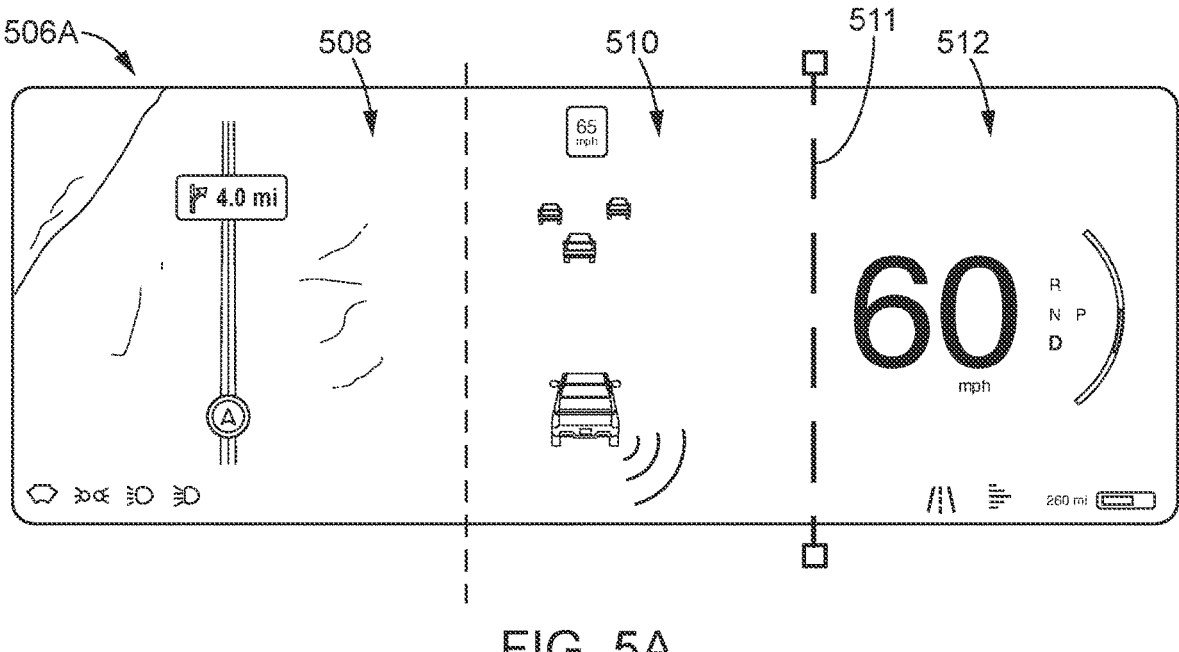
FIG. 5A illustrates an example of a default view that may be displayed on an instrument cluster, in accordance with certain embodiments of the present disclosure.
Figure 5B:
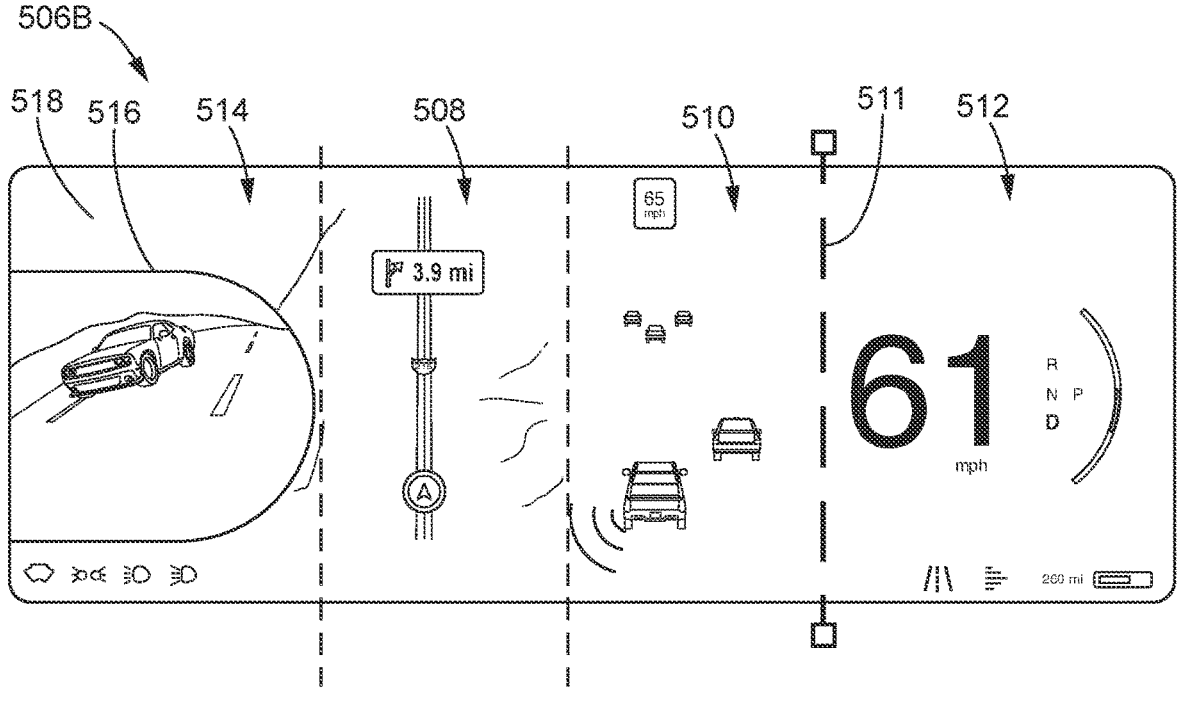
FIG. 5B illustrates an example of a situational view that may be displayed on an instrument cluster, in accordance with certain embodiments of the present disclosure.
Figure 5C:
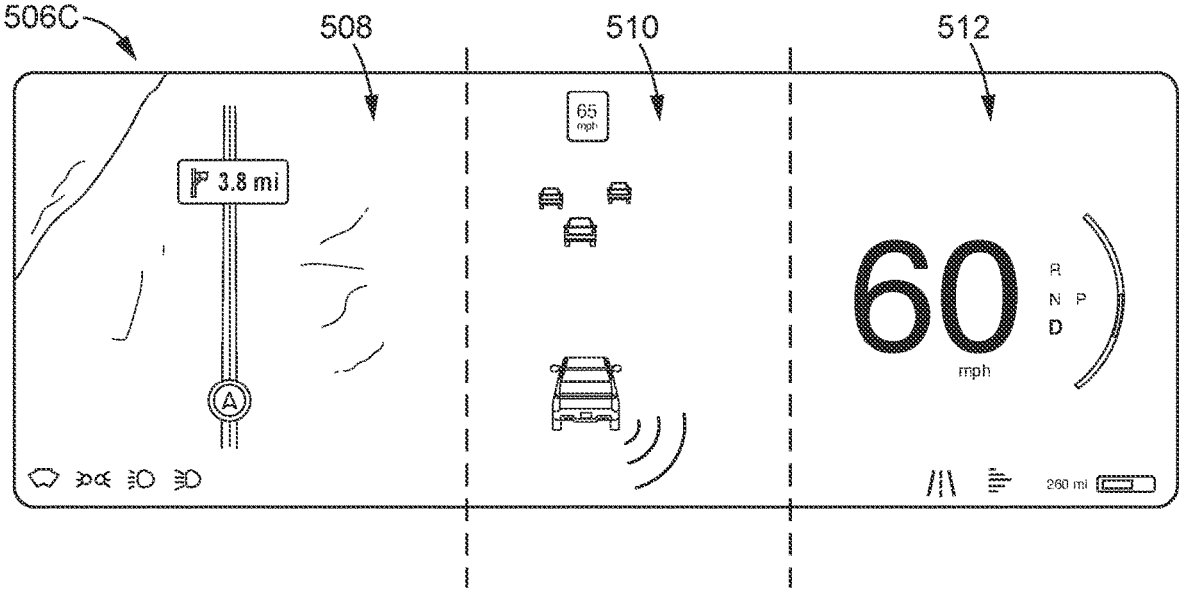
FIG. 5C illustrates an example of a default view that may be presented on an instrument cluster subsequent to the situational view of FIG. 5B, in accordance with certain embodiments of the present disclosure.

FIGS. 5A-C illustrate an example of updating a vehicle display, such as the instrument cluster 204 of FIG. 2, in response to an information trigger associated with the driver side of vehicle 100, in accordance with certain embodiments of the present disclosure. It should be appreciated that the dashed lines shown in FIGS. 5A-C are solely for descriptive purposes and are not part of the respective views.

In particular, FIG. 5A illustrates a default view 506A that may be presented on the instrument cluster 204, in accordance with certain embodiments of the present disclosure. The default view 506A includes three adjacent display regions, namely, a display region 508, a display region 510, and a display region 512. Although three display regions are shown in FIG. 5A, it should be appreciated that the default view 506A can include one, two, three, four, five, or any other suitable number of display regions. The display regions 508, 510, and 512 each include a set of dynamic vehicle information that is updated in real-time, for example, by the control system 104 (e.g., the XMM ECU 329). In the example of FIG. 5A, the display regions 508, 510, and 512 include GPS map and navigation information, ADAS data, and vehicle speed, respectively.

As mentioned previously, in the example of FIGS. 5A-C, the information trigger is associated with the driver side of vehicle 100. Therefore, in the illustrated embodiment, the control system 104 establishes an anchor point 511 in the default view 506A to the left of the right-most display region, i.e., between the display region 510 and the display region 512. In various embodiments, the establishment of the anchor point 511 to the left of the display region 512 has the effect of locking the size and position of the display region 512, such that it remains unmodified, as further described relative to FIG. 5B.

FIG. 5B illustrates a situational view 506B that may be generated responsive to the information trigger and displayed on the instrument cluster 204, in accordance with certain embodiments of the present disclosure. The situational view 506B includes a situational display region 514 together with the display regions 508, 510, and 512.

Still with reference to the situational view 506B, the display regions to the left of the anchor point 511, namely, the display regions 508 and 510, are adjusted relative to the default view 506A to accommodate the situational display region 514 in the same display footprint. In various embodiments, the adjustments can include, for example, position shifting, trimming, zoom-level modification (e.g., modification of a zoom level of a map), combinations of the foregoing and/or the like. In particular, in the situational view 506B, the display regions 508 and 510 are trimmed and resized relative to the default view 506A.

In addition, in the situational view 506B, the positions of the display regions 508 and 510 are shifted to the right relative to the default view 506A by an amount approximately equal to their combined reduced width. Advantageously, in certain embodiments, at least selected core content of the display regions 508 and 510 is unmodified relative to the default view 506A. For example, the display regions 508 and 510 shown in the situational view 506B reflect unobscured center slices or portions of the display regions 508 and 510 shown in the default view 506A, the content of which is unchanged between the views.

Still with reference to the situational view 506B, the situational display region 514 includes a live video feed 516 and a background 518. The live video feed 516 can correspond to a specified segment of a live field of view of one or more of the cameras 120 described relative to FIGS. 1 and 3. In various cases, the live video feed 516 may be mirrored relative to a given camera perspective for more intuitive presentation to the driver, in similar fashion to a side mirror. For example, if the live field of view is from a camera looking from front to rear (e.g., such that the driver side of vehicle 100 is on the left), the live video feed 516 can be mirrored in real-time to flip the perspective to that of a typical driver-side mirror view (e.g., such that the driver side of vehicle 100 would be on the right). Further, in certain embodiments, the live video feed 516 may be shaped in a way that maximizes its informational impact to the driver, such as in the shape of a typical side mirror as shown in FIG. 5B. Other shapes will be apparent to one skilled in the art after a detailed review of the present disclosure.

According to the example of FIG. 5B, the live video feed 516 corresponds to a blind spot on the driver side of vehicle 100. Advantageously, in certain embodiments, the situational display region 514 is arranged on the left side, or driver side of the situational view 506B, in correspondence to the information trigger that is likewise associated with the driver side of vehicle 100. In various embodiments, this arrangement enables the driver to more easily interpret the live video feed 516 as corresponding to the driver side of the vehicle. The background 518 of the situational display region 514 can include, for example, content that blends with the adjacent display region, i.e., the display region 508. For example, the background 518 can include additional GPS map data for the purpose of providing visual continuity with the display region 508, although the additional GPS map data may be less relevant than what is provided in the display region 508.

Advantageously, in certain embodiments, the situational view 506B minimizes an amount of visual change a driver must process relative to the default view 506A. For example, in the illustration of FIG. 5B, the display regions 508, 510, and 512 are in the same order in both the default view 506A and the situational view 506B. Further, the display region to the right of the anchor point 511, namely, the display region 512, has not been adjusted relative to the default view 506A. Therefore, in the example of FIG. 5B, the display region 612 retains the same size, position and content in both the default view 506A and the situational view 506B. In certain embodiments, the unadjusted nature of the display region 512 provides a fixed point of reference for the driver, thereby allowing the driver to more easily process new information provided in the situational display region 514.

In various embodiments, the adjustments to the display regions 508 and 510, combined with the presentation of the situational display region 514, can manifest to the driver as a visual squeeze or squish of the display regions 508 and 510 to the anchor point 511. In various embodiments, the visual squeezing or squishing is more easily interpreted by the driver than, for example, a new display format. In some embodiments, the visual squeeze or squish can appear as an animation that provides a visual transition from the default view 506A to the situational view 506B.

FIG. 5C illustrates a default view 506C that may be presented on the instrument cluster 204 subsequent to the situational view 506B, in accordance with certain embodiments of the present disclosure. The default view 506C includes the display regions 508, 510, and 512, in similar fashion to the default view 506A. In various embodiments, the default view 506C can be displayed, for example, in response to a trigger to return to a default view (i.e., a return trigger). The return trigger can be, for example, an expiration of a period of time (e.g., 3 seconds), a removal of a condition serving as the basis for the information trigger (e.g., the driver side turn signal is no longer active, there is no longer a vehicle in a blind spot on the driver side of vehicle 100, etc.), and/or the like. In some embodiments, the return to the default view 506C can appear to the driver as a visual expansion of the display regions 508 and 510, away from the anchor point 511, as the situational display region 514 disappears, thereby reversing the visual squeeze or squish described previously relative to FIG. 5B.

Figure 6A:
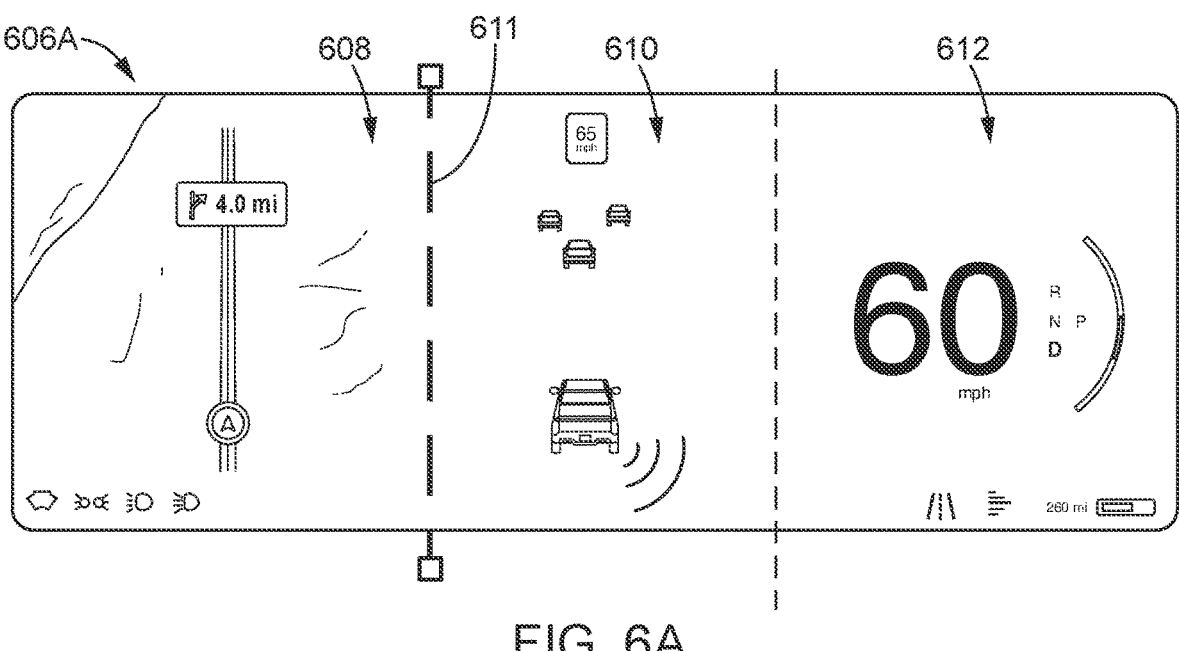
FIG. 6A illustrates an example of a default view that may be displayed on an instrument cluster, in accordance with certain embodiments of the present disclosure.
Figure 6B:
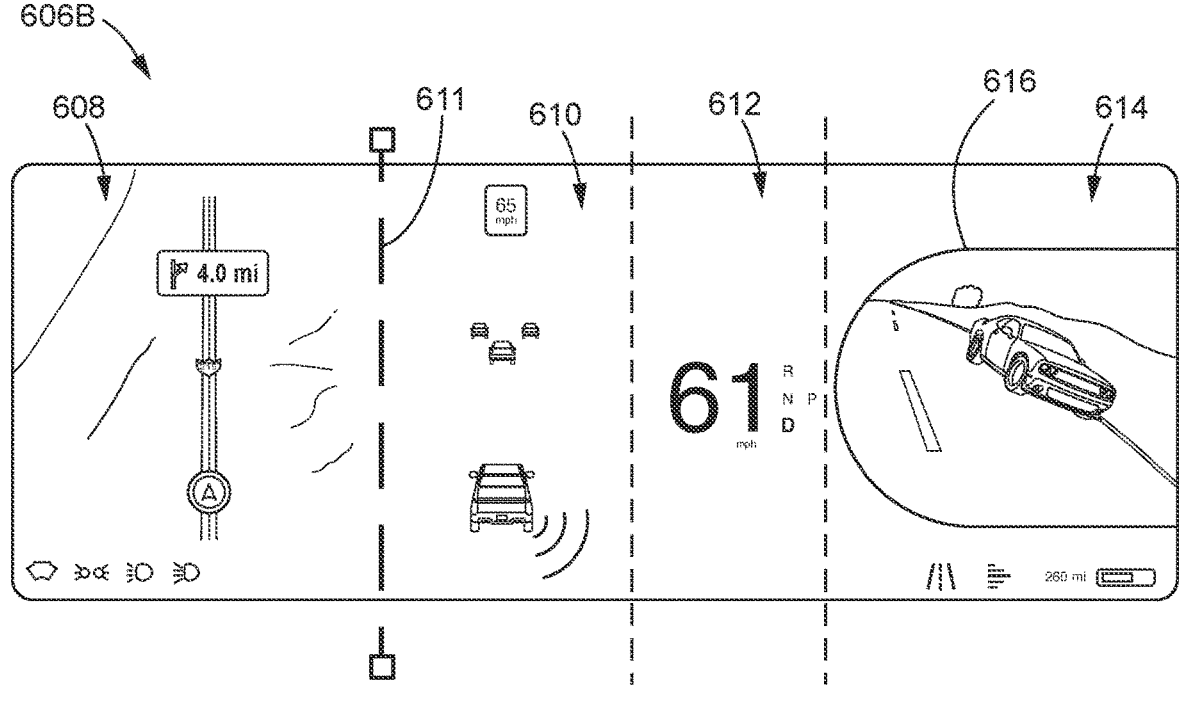
FIG. 6B illustrates an example of a situational view that may be displayed on an instrument cluster, in accordance with certain embodiments of the present disclosure.
Figure 6C:
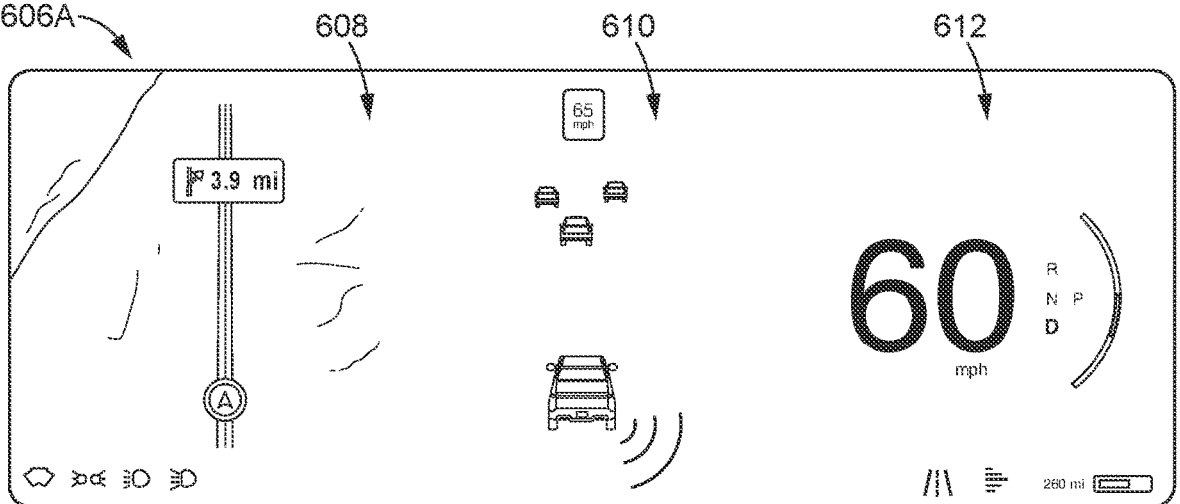
FIG. 6C illustrates an example of a default view that may be presented on an instrument cluster subsequent to the situational view of FIG. 6B, in accordance with certain embodiments of the present disclosure.

FIGS. 6A-C illustrate an example of updating a vehicle display, such as the instrument cluster 204 of FIG. 2, in response to an information trigger associated with the passenger side of vehicle 100, in accordance with certain embodiments of the present disclosure. It should be appreciated that the dashed lines shown in FIGS. 6A-C are for solely for descriptive purposes and are not part of the respective views.

In particular, FIG. 6A illustrates a default view 606A that may be presented on the instrument cluster 204, in accordance with certain embodiments of the present disclosure. The default view 606A includes three adjacent display regions, namely, a display region 608, a display region 610, and a display region 612. Although three display regions are shown in FIG. 6A, it should be appreciated that the default view 606A can include one, two, three, four, five, or any other suitable number of display regions. The display regions 608, 610, and 612 each include a set of dynamic vehicle information that is updated in real-time, for example, by the control system 104 (e.g., the XMM ECU 329). In the example of FIG. 6A, the display regions 608, 610, and 612 include GPS map and navigation information, ADAS data, and vehicle speed, respectively.

As mentioned previously, in the example of FIGS. 6A-C, the information trigger is associated with the passenger side of vehicle 100. Therefore, in the illustrated embodiment, the control system 104 establishes an anchor point 611 in the default view 606A to the right of the left-most display region, i.e., between the display region 608 and the display region 610. In various embodiments, the establishment of the anchor point 611 to the right of the display region 608 has the effect of locking the size and position of the display region 608, such that it remains unmodified, as further described relative to FIG. 6B.

FIG. 6B illustrates a situational view 606B that may be generated responsive to the information trigger and displayed on the instrument cluster 204, in accordance with certain embodiments of the present disclosure. The situational view 606B includes a situational display region 614 together with the display regions 608, 610, and 612.

Still with reference to the situational view 606B, the display regions to the right of the anchor point 611, namely, the display regions 610 and 612, are adjusted relative to the default view 606A to accommodate the situational display region 614 in the same display footprint. In various embodiments, the adjustments can include, for example, position shifting, trimming, zoom-level modification (e.g., modification of a zoom level of a map), combinations of the foregoing and/or the like. In particular, in the situational view 606B, the display regions 610 and 612 are trimmed and resized relative to the default view 606A. In addition, in the situational view 606B, the positions of the display regions 610 and 612 are shifted to the left relative to the default view 606A by an amount approximately equal to their combined reduced width. Advantageously, in certain embodiments, at least selected core content of the display regions 610 and 612 is unmodified relative to the default view 606A. For example, the display regions 610 and 612 shown in the situational view 606B reflect unobscured center slices or portions of the display regions 610 and 612 shown in the default view 606A, the content of which is unchanged between the views.

Still with reference to the situational view 606B, the situational display region 614 includes a live video feed 616. The live video feed 616 can correspond to a specified segment of a live field of view of one or more of the cameras 120 described relative to FIGS. 1 and 3. In various cases, the live video feed 616 may be mirrored relative to a given camera perspective for more intuitive presentation to the driver, in similar fashion to a side mirror. For example, if the live field of view is from a camera looking from front to rear (e.g., such that the passenger side of vehicle 100 is on the right), the live video feed 616 can be mirrored in real-time to flip the perspective to that of a typical passenger-side mirror view (e.g., such that the passenger side of vehicle 100 is on the left). Further, in certain embodiments, the live video feed 616 may be shaped in a way that maximizes its informational impact to the driver, such as in the shape of a typical side mirror as shown in FIG. 6B. Other shapes will be apparent to one skilled in the art after a detailed review of the present disclosure.

According to the example of FIG. 6B, the live video feed 616 corresponds to a blind spot on the passenger side of vehicle 100. Advantageously, in certain embodiments, the situational display region 614 is arranged on the right side, or passenger side of the situational view 606B, in correspondence to the information trigger that is likewise associated with the passenger side of vehicle 100. In various embodiments, this arrangement enables the driver to more easily interpret the live video feed 616 as corresponding to the passenger side of the vehicle.

Advantageously, in certain embodiments, the situational view 606B minimizes an amount of visual change a driver must process relative to the default view 606A. For example, in the illustration of FIG. 6B, the display regions 608, 610, and 612 are in the same order in both the default view 606A and the situational view 606B. Further, the display region to the left of the anchor point 611, namely, the display region 608, has not been adjusted relative to the default view 606A. Therefore, in the example of FIG. 6B, the display region 608 retains the same size, position and content in both the default view 606A and the situational view 606B. In certain embodiments, the unadjusted nature of the display region 608 provides a fixed point of reference for the driver, thereby allowing the driver to more easily process new information provided in the situational display region 614.

In various embodiments, the adjustments to the display regions 610 and 612, combined with the presentation of the situational display region 614, can appear to the driver as a visual squeeze or squish of the display regions 610 and 612 to the anchor point 611. In various embodiments, the visual squeezing or squishing is more easily interpreted by the driver than, for example, a new display format. In some embodiments, the visual squeeze or squish can appear as an animation that provides a visual transition from the default view 606A to the situational view 606B.

FIG. 6C illustrates a default view 606C that may be presented on the instrument cluster 204 subsequent to the situational view 606B, in accordance with certain embodiments of the present disclosure. The default view 606C includes the display regions 608, 610, and 612, in similar fashion to the default view 606A. In various embodiments, the default view 606C can be displayed, for example, in response to a trigger to return to a default view (i.e., a return trigger). The return trigger can be, for example, an expiration of a period of time (e.g., 3 seconds), a removal of a condition serving as the basis for the information trigger (e.g., the passenger side turn signal is no longer active, there is no longer a vehicle in a blind spot on the passenger side of vehicle 100), and/or the like. In some embodiments, the return to the default view 606C can appear to the driver as a visual expansion of the display regions 610 and 612, away from the anchor point 611, as the situational display region 614 disappears, thereby reversing the visual squeeze or squish described previously relative to FIG. 6B.

Referring now to FIGS. 5A-C and 6A-C collectively, in various embodiments, situational display regions can be sized differently in different situations, for example, in correspondence to a vehicle portion at issue for a given information trigger. In an example, it may be the case that a blind spot on the passenger side of vehicle 100 is larger than a blind spot on the driver side of vehicle 100. In certain embodiments, the control system 104 can optimize vehicle safety by generating situational display regions and live video feeds for the passenger side of vehicle 100 than for the driver side of vehicle 100 (e.g., larger in display area). For example, the situational display region 614 and the live video feed 616, which relate to the passenger side of vehicle 100, are shown to be larger than the situational display region 514 and the live video feed 516, which relate to the driver side of vehicle 100. Other examples of situationally varying display regions will be apparent to one skilled in the art after a detailed review of the present disclosure.

Figure 7:
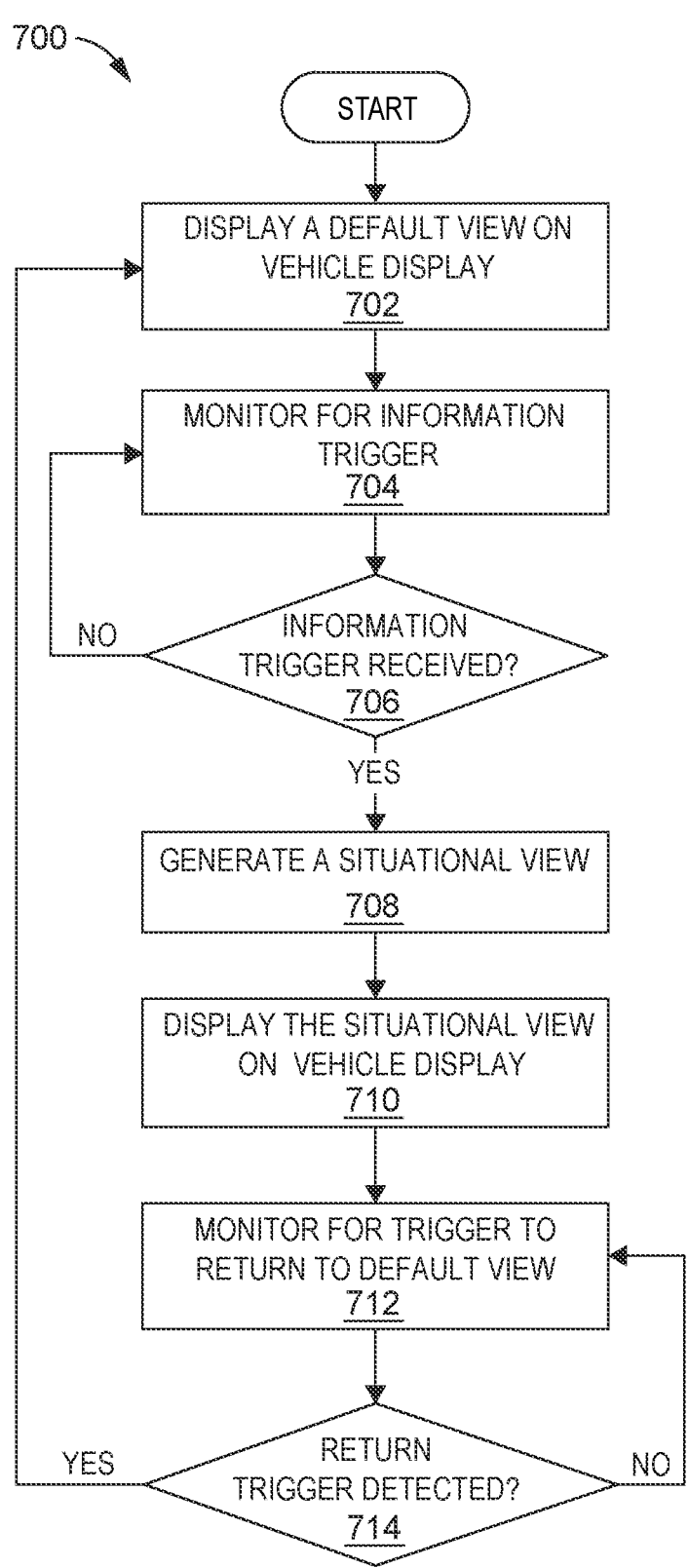
FIG. 7 illustrates an example of a process for situationally updating a vehicle display, in accordance with certain embodiments of the present disclosure.

FIG. 7 illustrates an example of a process 700 for situationally updating a vehicle display, in accordance with certain embodiments of the present disclosure. In certain embodiments, the process 700 can be implemented by any vehicle system that can process data. Although any number of systems, in whole or in part, can implement the process 700, to simplify discussion, the process 700 will be described in relation to the control system 104 of vehicle 100 as described relative to FIGS. 1-3, 4A-B, 5A-C, and 6A-C.

At block 702, the control system 104 displays a default view on a vehicle display proximate a driver, such as the instrument cluster 204 of FIG. 2, or causes the default view to be displayed. The default view can be displayed, for example, as described relative to FIGS. 5A and 6A.

At block 704, the control system 104 monitors for an information trigger such as, for example, a safety alert as described relative to FIG. 4A, a turn signal notification as described relative to FIG. 4B, and/or the like. At decision block 706, the control system 104 determines whether an information trigger has been received. If no information trigger has been received, the process 700 returns to the block 704 and executes as described previously. Otherwise, if it is determined at the decision block 706 that an information trigger has been received, the process 700 proceeds to block 708.

At block 708, the control system 104 generates a situational view such as, for example, the situational view 506B described relative to FIG. 5B or the situational view 606B described relative to FIG. 6B. An example of generating the situational view will be described relative to FIG. 8. At block 710, the control system 104 displays the situational view on the vehicle display, or causes the situational view to be displayed.

At block 712, the control system 104 monitors for a trigger to return the vehicle display to the default view (i.e., a return trigger). The return trigger can be, for example, an expiration of a period of time (e.g., 3 seconds), a removal of a condition serving as the basis for the information trigger (e.g., a relevant turn signal is no longer active, there is no longer a vehicle in a blind spot on a relevant side of vehicle 100), and/or the like. At decision block 714, the control system 104 determines whether a return trigger has been detected. If not, the process 700 returns to the block 712 and the control system 104 continues to monitor for a return trigger. Otherwise, if it is determined at the decision block 714 that a return trigger has been detected, the process 700 returns to the block 702 for display of the default view. In various embodiments, the process 700 can continue to execute until a gear state of vehicle 100 changes (e.g., from drive to a different state), vehicle 100 is powered off, or other suitable stop criteria is satisfied.

FIG. 8 illustrates an example of a process 800 for generating a situational view, in accordance with certain embodiments of the present disclosure. In various embodiments, the process 800 can be performed as all or part of the block 708 of the process 700 of FIG. 7. In certain embodiments, the process 800 can be implemented by any vehicle system that can process data. Although any number of systems, in whole or in part, can implement the process 800, to simplify discussion, the process 800 will be described in relation to the control system 104 of vehicle 100 as described relative to FIGS. 1-3, 4A-B, 5A-C, and 6A-C.

At block 802, the control system 104 determines a vehicle portion associated with an information trigger, such as the information trigger described relative to the decision block 706 of FIG. 7. In some embodiments, the block 802 can involve the control system 104 determining a side of vehicle 100 that is associated with the information trigger. In an example, if the information trigger is a safety alert indicating a presence of a vehicle or object on the driver side or passenger side of vehicle 100 (e.g., as described relative to FIGS. 3 and 4A), the determined side can be the driver side or passenger side of vehicle 100, as applicable, in correspondence to the safety alert. In another example, if the information trigger is a turn signal notification indicating an active turn signal for the driver side or passenger side of vehicle 100 (e.g., as described relative to FIGS. 3 and 4B), the determined side can be the driver side or passenger side of vehicle 100, as applicable, in correspondence to the turn signal notification.

At block 804, the control system 104 selects a live video feed corresponding to the vehicle portion determined at the block 802. In an example, if the determined vehicle portion is the driver side of vehicle 100, the control system 104 can select a blind spot video feed for the driver side of vehicle 100 (e.g., the live video feed 516 described relative to FIG. 5B). In another example, if the determined vehicle portion is the passenger side of vehicle 100, the control system 104 can select a blind spot video feed for the passenger side of vehicle 100 (e.g., the live video feed 616 described relative to FIG. 6B).

At block 806, the control system 104 establishes an anchor point in relation to existing display regions of a default view, such as the default view displayed at the block 702 of FIG. 7. The default view may be similar, for example, to the default view 506A of FIG. 5A or the default view 606A of FIG. 6B. The existing display regions may be similar, for example, to the display regions 508, 510 and 512 of FIG. 5A and/or the display regions 608, 610 and 612 of FIG. 6A.

Still with reference to the block 806, the establishment of the anchor point can vary based on the vehicle portion determined at the block 802 (e.g., the driver side or passenger side of vehicle 100). In an example, if the determined vehicle portion is the driver side of vehicle 100, the control system 104 can establish the anchor point as described relative to the anchor point 511 of FIGS. 5A-B. In another example, if the determined vehicle portion is the passenger side of vehicle 100, the control system 104 can establish the anchor point as described relative to the anchor point 611 of FIGS. 6A-B.

At block 808, the control system 104 creates a situational display region for the live video feed selected at the block 804. The situational display region can be similar, for example, to the situational display region 514 of FIG. 5B or the situational display region 614 of FIG. 6B. The situational display region can include, for example, the selected live video feed and, in some cases, background similar to the background 518 described relative to FIG. 5B.

At block 810, the control system 104 arranges the situational display region relative to the existing display regions of the default view. In certain embodiments, the situational display region is arranged based on the anchor point established at the block 806 and the vehicle portion determined at the block 802. In an example, if the determined vehicle portion is the driver side of vehicle 100, the control system 104 can arrange the situational display region based on the anchor point as described relative to FIG. 5B. In another example, if the determined vehicle portion is the passenger side of vehicle 100, the control system 104 can arrange the situational display region based on the anchor point as described relative to FIG. 6B.

In certain embodiments, an output of the block 810 is a situational view similar, for example, to the situational view 506B of FIG. 5B and/or the situational view 606B of FIG. 6B. The situational view may be displayed, for example, as part of the block 710 of FIG. 7, as described previously. After block 810, the process 800 ends.

For illustrative purposes, the present disclosure periodically describes a single situational display region being shown at a given time. However, it should be appreciated that, in certain embodiments, more than one situational display region can be shown at a given time. For example, if there are informational triggers for both a driver side and a passenger side of a vehicle, the instrument cluster 204 can show both a situational display region similar to the situational display region 514 of FIG. 5B and a situational display region similar to the situational display region 614 of FIG. 6B, with other display regions being further adjusted or, in some cases, removed.

Further, for illustrative purposes, the present disclosure periodically describes situational display regions as corresponding to the driver side or passenger side of vehicle 100. It should be appreciated, however, that situational display regions may also correspond to other portions of vehicle 100 including, but not limited to, a front of vehicle 100, a rear of vehicle 100, and/or any section thereof. For example, an information trigger associated with the front of vehicle 100 may result in a situational view having a situational display region emanating from a top or other section thereof and showing, inter alia, a live video feed corresponding to the front of vehicle 100. In another example, an information trigger associated with the rear of vehicle 100 may result in a situational view having a situational display region emanating from a bottom or other section thereof and showing, inter alia, a live video feed corresponding to the rear of vehicle 100. Other examples and variations will be apparent to one skilled in the art after a detailed review of the present disclosure.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of situationally updating a vehicle display, the method comprising:

causing, by a vehicle control system, a first view to be displayed on the vehicle display, wherein the first view comprises a first display region and a second display region adjacent to the first display region;

receiving, by the vehicle control system, an information trigger in relation to a vehicle comprising the vehicle display;

generating, by the vehicle control system based on the information trigger, a second view comprising the first display region, the second display region, and a situational display region, the generating comprising establishing an anchor point in the first view between the first display region and the second display region such that at least a size and position of the second display region are unmodified in the second view relative to the first view, the second view adjusting the first display region relative to the first view to accommodate the situational display region; and responsive to the information trigger, causing, by the vehicle control system, the second view to be displayed on the vehicle display.

2. The method of claim 1, wherein the generating the second view further comprises:

determining a side of the vehicle associated with the information trigger, wherein the anchor point is established based on the determined side;

selecting a live video feed corresponding to the determined side of the vehicle, the situational display region comprising the selected live video feed; and arranging the situational display region on a side of the second view corresponding to the determined side of the vehicle.

3. The method of claim 2, wherein the determined side is at least one of a driver side of the vehicle or a passenger side of the vehicle.

4. The method of claim 2, wherein:

the situational display region is associated with a first size responsive to a determination that the side of the vehicle associated with the information trigger is a driver side of the vehicle;

the situational display region is associated with a second size responsive to a determination that the side of the vehicle associated with the information trigger is a passenger side of the vehicle; and the second size is larger than the first size.

5. The method of claim 2, wherein the information trigger indicates at least one of an active turn signal for the determined side of the vehicle or a presence of an object on the determined side of the vehicle.

6. The method of claim 2, wherein the adjusting the first display region relative to the first view comprises:

shifting a position of the first display region relative to the first view; and resizing the first display region relative to the first view.

7. The method of claim 2, wherein:

the first view further comprises a third display region adjacent to the first display region; and the second view further comprises the third display region, the second view adjusting the third display region relative to the first view to accommodate the situational display region.

8. The method of claim 1, wherein the causing comprises visually squeezing the first display region to the anchor point in correspondence to the adjusting.

9. The method of claim 1, wherein at least selected center content of the first display region is unmodified in the second view relative to the first view.

10. The method of claim 1, wherein the adjusting the first display region comprises at least one of the following:

trimming the first display region relative to the first view; or modifying a zoom level of at least a portion of the first display region relative to the first view.

11. The method of claim 1, further comprising:

detecting a trigger to return to the first view; and responsive to the trigger, causing the first view to be displayed on the vehicle display.

12. The method of claim 1, wherein the first display region comprises dynamic vehicle information, the dynamic vehicle information comprising at least one of global positioning system (GPS) map data, Advanced Driver-Assistance Systems (ADAS) data, or vehicle speed.

13. The method of claim 1, wherein the vehicle display comprises an instrument cluster.

14. A system for situationally updating a vehicle display, the system comprising:

a vehicle display; and a vehicle control system communicably coupled to the vehicle display, wherein the vehicle control system is operable to:

cause a first view to be displayed on the vehicle display, wherein the first view comprises a first display region and a second display region adjacent to the first display region;

receive an information trigger in relation to a vehicle comprising the vehicle display;

generate, based on the information trigger, a second view comprising the first display region, the second display region, and a situational display region, the generation comprising establishing an anchor point in the first view between the first display region and the second display region such that at least a size and position of the second display region are unmodified in the second view relative to the first view, the second view adjusting the first display region relative to the first view to accommodate the situational display region; and responsive to the information trigger, cause a second view to be displayed on the vehicle display.

15. The system of claim 14, wherein the generation of the second view further comprises:

determine determining a side of the vehicle associated with the information trigger, wherein the anchor point is established based on the determined side;

selecting a live video feed corresponding to the determined side of the vehicle, the situational display region comprising the selected live video feed; and arranging the situational display region on a side of the second view corresponding to the determined side of the vehicle.

16. The system of claim 15, wherein:

the situational display region is associated with a first size responsive to a determination that the side of the vehicle associated with the information trigger is a driver side of the vehicle;

the situational display region is associated with a second size responsive to a determination that the side of the vehicle associated with the information trigger is a passenger side of the vehicle; and the second size is larger than the first size.

17. The system of claim 15, wherein the information trigger indicates at least one of an active turn signal for the determined side of the vehicle or a presence of an object on the determined side of the vehicle.

18. The system of claim 15, wherein the adjusting the first display region relative to the first view comprises:

shifting a position of the first display region relative to the first view; and resizing the first display region relative to the first view.

19. The system of claim 14, wherein the operability to cause the second view to be displayed on the vehicle display comprises visually squeezing the first display region to the anchor point in correspondence to the adjusting.

20. The system of claim 14, wherein at least selected center content of the first display region is unmodified in the second view relative to the first view.

* * * * *